US010187583B2

(12) United States Patent
Kasai et al.

(10) Patent No.: US 10,187,583 B2
(45) Date of Patent: Jan. 22, 2019

(54) CONTROL DEVICE, CONTROL METHOD, AND CONTROL SYSTEM WITH INDEPENDENT EXPOSURE CONTROLS

(71) Applicant: Sony Corporation, Tokyo (JP)

(72) Inventors: Daisuke Kasai, Tokyo (JP); Motoshi Yamaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/528,405

(22) Filed: Oct. 30, 2014

(65) Prior Publication Data

US 2015/0181096 A1 Jun. 25, 2015

(30) Foreign Application Priority Data

Dec. 25, 2013 (JP) .................................. 2013-266831

(51) Int. Cl.
*H04N 5/235* (2006.01)
*H04N 5/232* (2006.01)

(52) U.S. Cl.
CPC ....... *H04N 5/2352* (2013.01); *H04N 5/23212* (2013.01)

(58) Field of Classification Search
CPC ............. H04N 5/23212; H04N 5/2356; H04N 5/2351; H04N 5/2353; H04N 5/235
See application file for complete search history.

(56) References Cited

U.S. PATENT DOCUMENTS

| 5,093,716 A * | 3/1992 | Kondo | H04N 5/23212 348/224.1 |
| 9,438,815 B2 * | 9/2016 | Oda | H04N 5/2355 |
| 9,736,386 B2 * | 8/2017 | Yamaguchi | H04N 5/235 |
| 2004/0070682 A1 * | 4/2004 | Voss | H04N 3/1562 348/362 |
| 2004/0141075 A1 * | 7/2004 | Xu | H04N 5/2351 348/296 |
| 2004/0189856 A1 * | 9/2004 | Tanaka | H04N 5/23212 348/345 |
| 2004/0252223 A1 * | 12/2004 | Masuno | H04N 5/23212 348/345 |
| 2007/0018069 A1 * | 1/2007 | Higashino | G03B 13/36 250/200 |
| 2007/0196089 A1 * | 8/2007 | Yamaguchi | G03B 13/36 396/56 |

(Continued)

FOREIGN PATENT DOCUMENTS

| JP | 2003-121732 A | 4/2003 |
| JP | 2006-163094 A | 6/2006 |

(Continued)

OTHER PUBLICATIONS

Japanese Office Action dated Oct. 4, 2016 for corresponding Japanese Application No. 2013-266831.

*Primary Examiner* — Abdelaaziz Tissire
(74) *Attorney, Agent, or Firm* — Michael Best & Friedrich LLP

(57) ABSTRACT

There is provided a control device that controls exposure of a first pixel group and a second pixel group disposed in a single imaging surface. The control device performs exposure control of the second pixel group independently of exposure control of the first pixel group in accordance with a designated focus position.

22 Claims, 6 Drawing Sheets

(56) References Cited

U.S. PATENT DOCUMENTS

| | | | | |
|---|---|---|---|---|
| 2007/0196091 A1* | 8/2007 | Yamaguchi | G03B 13/36 | 396/95 |
| 2008/0198258 A1* | 8/2008 | Ito | G03B 13/02 | 348/349 |
| 2009/0244357 A1* | 10/2009 | Huang | H04N 5/23212 | 348/345 |
| 2009/0278966 A1* | 11/2009 | Kusaka | G02B 7/36 | 348/294 |
| 2010/0020222 A1* | 1/2010 | Jones | G06F 3/04883 | 348/333.02 |
| 2011/0038563 A1* | 2/2011 | Bremer | G06K 7/10722 | 382/313 |
| 2011/0050972 A1* | 3/2011 | Ishitsuka | H04N 5/23293 | 348/333.01 |
| 2011/0058070 A1* | 3/2011 | Awazu | H04N 5/23212 | 348/241 |
| 2011/0097067 A1* | 4/2011 | Osawa | G03B 7/097 | 396/165 |
| 2011/0141331 A1* | 6/2011 | Lee | H04N 5/2353 | 348/297 |
| 2011/0149129 A1* | 6/2011 | Kim, II | H04N 5/2351 | 348/296 |
| 2011/0249961 A1* | 10/2011 | Brunner | H04N 5/23216 | 396/213 |
| 2012/0057046 A1* | 3/2012 | Tanaka | H04N 5/2357 | 348/229.1 |
| 2012/0105674 A1* | 5/2012 | Sakaji | H04N 5/23216 | 348/229.1 |
| 2012/0113056 A1* | 5/2012 | Koizumi | H04N 5/232 | 345/175 |
| 2012/0176505 A1* | 7/2012 | Kim | H04N 5/23219 | 348/222.1 |
| 2012/0235021 A1* | 9/2012 | Kasai | H04N 5/35527 | 250/208.1 |
| 2012/0237195 A1* | 9/2012 | Masuyama | G03B 7/0993 | 396/233 |
| 2012/0301125 A1* | 11/2012 | Ashida | G03B 13/36 | 396/95 |
| 2012/0327267 A1* | 12/2012 | Takahara | G02B 7/34 | 348/231.99 |
| 2013/0051700 A1* | 2/2013 | Jo | H04N 5/23254 | 382/284 |
| 2014/0240585 A1* | 8/2014 | Takahara | G02B 7/34 | 348/345 |
| 2014/0285685 A1* | 9/2014 | Theuwissen | H04N 5/23212 | 348/229.1 |
| 2014/0307145 A1* | 10/2014 | Ito | H04N 5/23212 | 348/333.08 |
| 2014/0333823 A1* | 11/2014 | Sakaguchi | H04N 5/23212 | 348/353 |
| 2014/0347532 A1* | 11/2014 | Kang | H04N 5/351 | 348/294 |
| 2015/0092098 A1* | 4/2015 | Konishi | H04N 5/23212 | 348/333.11 |
| 2015/0181095 A1* | 6/2015 | Yamaguchi | H04N 5/23212 | 348/229.1 |
| 2015/0181102 A1* | 6/2015 | Oda | H04N 5/2355 | 348/229.1 |
| 2015/0350533 A1* | 12/2015 | Harris | H04N 5/2355 | 348/362 |
| 2015/0373250 A1* | 12/2015 | Sfaradi | H04N 5/23212 | 348/345 |
| 2016/0014359 A1* | 1/2016 | Ota | H04N 5/3696 | 348/223.1 |
| 2016/0173751 A1* | 6/2016 | Nakata | H04N 5/2355 | 348/362 |
| 2016/0173759 A1* | 6/2016 | Nakamura | H04N 5/23212 | 348/222.1 |
| 2016/0227101 A1* | 8/2016 | Iwasaki | H04N 5/23212 | |
| 2016/0316132 A1* | 10/2016 | Kinoshita | H04N 5/345 | |
| 2017/0155820 A1* | 6/2017 | Kikuchi | H04N 5/23212 | |
| 2017/0187949 A1* | 6/2017 | Kim | H04N 5/23212 | |
| 2018/0063411 A1* | 3/2018 | Rivard | H04N 5/2252 | |
| 2018/0077337 A1* | 3/2018 | Fujii | H04N 5/23212 | |

FOREIGN PATENT DOCUMENTS

| | | |
|---|---|---|
| JP | 2006-243373 A | 9/2006 |
| JP | 2007-243909 A | 9/2007 |
| JP | 2008-134389 A | 6/2008 |
| JP | 2011-232371 A | 11/2011 |
| JP | 2013-145314 A | 7/2013 |

* cited by examiner

CONTROL DEVICE, CONTROL METHOD, AND CONTROL SYSTEM WITH INDEPENDENT EXPOSURE CONTROLS

CROSS REFERENCE TO RELATED APPLICATIONS

This application claims the benefit of Japanese Priority Patent Application JP 2013-266831 filed Dec. 25, 2013, the entire contents of which are incorporated herein by reference.

BACKGROUND

The present disclosure relates to control devices, control methods, and control systems.

In recent years, an imaging apparatus, such as a digital camera, equipped with an imaging element having a plurality of photo-electric converters and in which the pixels thereof are divided is becoming widely available. By using such an imaging element, a phase-difference-detection autofocus (sometimes referred to as "phase-difference AF" hereinafter) mode that allows for high-speed autofocusing becomes possible.

For example, JP 2008-134389A discloses a method for controlling an imaging apparatus that uses an imaging element including phase-difference AF pixels and normal pixels. In JP 2008-134389A, phase-difference AF is performed by using the phase-difference AF pixels, whereas contrast autofocus (AF), live-view display, an automatic exposure (AE) process, and an auto-white-balance (AWB) process are performed by using the normal pixels.

SUMMARY

However, in the related art, the AE settings of the phase-difference AF pixels are the same as those of the normal pixels due to hardware limitations. Therefore, the automatic exposure process during autofocusing (particularly, during continuous AF servo (AF-C)) often complies with the AE-frame settings of the normal pixels, such as multi-division photometry, thus making it difficult to perform an automatic exposure process specific for autofocusing. Therefore, the AE settings of the phase-difference AF pixels, such as an image updating cycle and luminance during AF, are affected by the brightness outside an AF-frame region, resulting in lower AF precision as well as lower AF speed.

Thus, a proposition of an automatic exposure process that allows for enhanced AF performance has been in demand.

According to an embodiment of the present disclosure, there is provided a control device that controls exposure of a first pixel group and a second pixel group disposed in a single imaging surface. The control device performs exposure control of the second pixel group independently of exposure control of the first pixel group in accordance with a designated focus position.

According to another embodiment of the present disclosure, there is provided a control method including performing exposure control of a second pixel group independently of exposure control of a first pixel group in accordance with a designated focus position, the first pixel group and the second pixel group being disposed in a single imaging surface.

According to another embodiment of the present disclosure, there is provided a control system including a first pixel group and a second pixel group configured to be disposed in a single imaging surface, and a control unit configured to control exposure of the first pixel group and the second pixel group. The control unit performs exposure control of the second pixel group independently of exposure control of the first pixel group in accordance with a designated focus position.

According to one or more of embodiments of the present disclosure, with regard to the first pixel group and the second pixel group that are disposed in a single imaging surface, exposure control of the second pixel group is performed independently of exposure control of the first pixel group in accordance with the designated focus position. Thus, an AE setting process optimal for AF can be performed.

According to one or more of embodiments of the present disclosure described above, with regard to the first pixel group and the second pixel group that are disposed in a single imaging surface, exposure control of the second pixel group is performed with AE settings optimal for AF so that AF performance can be enhanced. The above-described advantage is not necessarily limitative. In addition to or in place of the above-described advantage, any of advantages described in this specification or another advantage obvious from this specification may be exhibited.

DETAILED DESCRIPTION OF THE EMBODIMENT(S)

Figure 1:
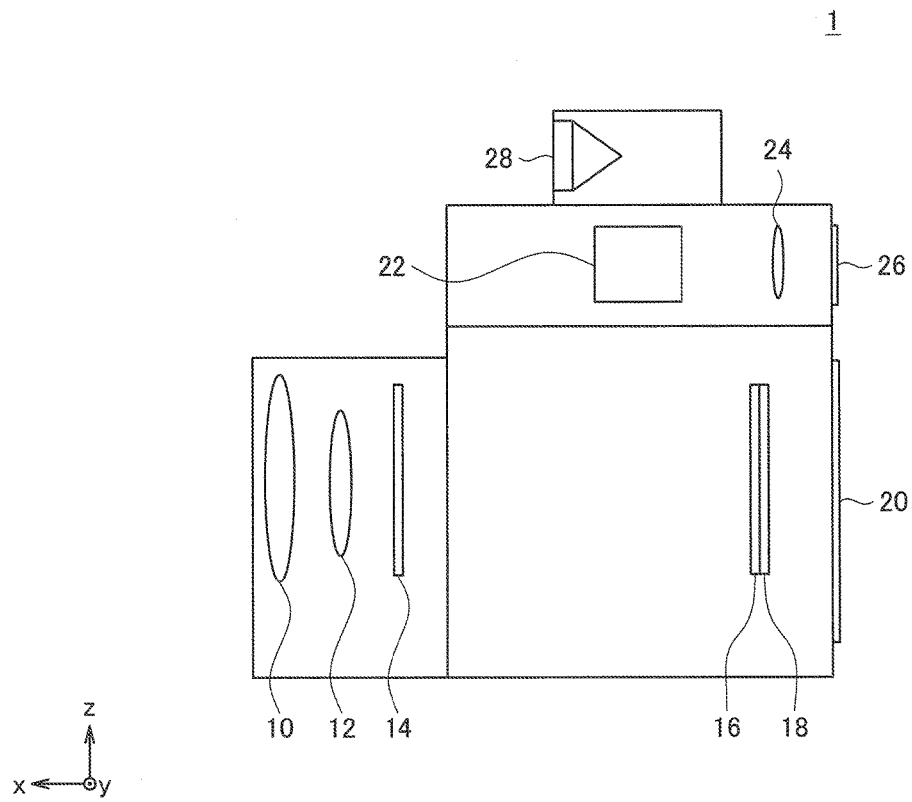
FIG. 1 is a cross-sectional view schematically illustrating a physical configuration of a digital camera including a control device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Figure 2:
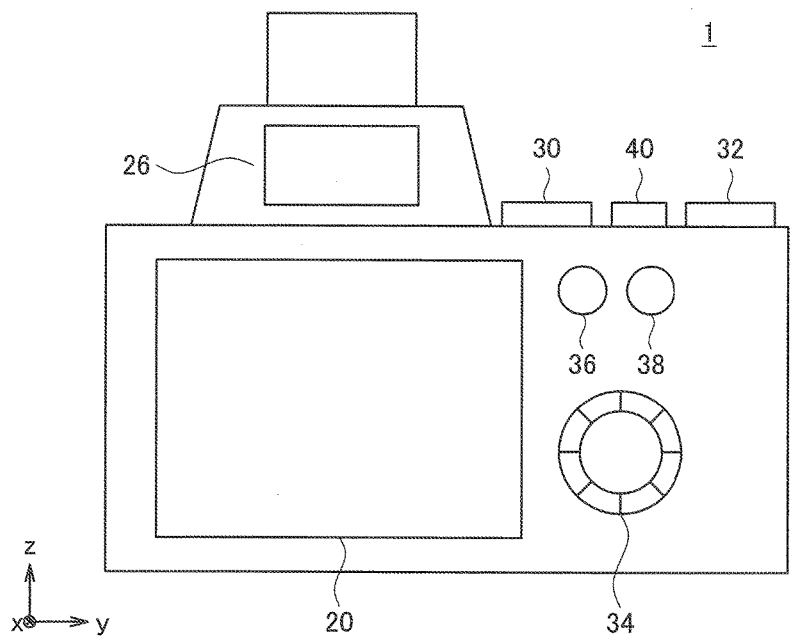
FIG. 2 is a rear view of the digital camera according to the embodiment.
Figure 3:
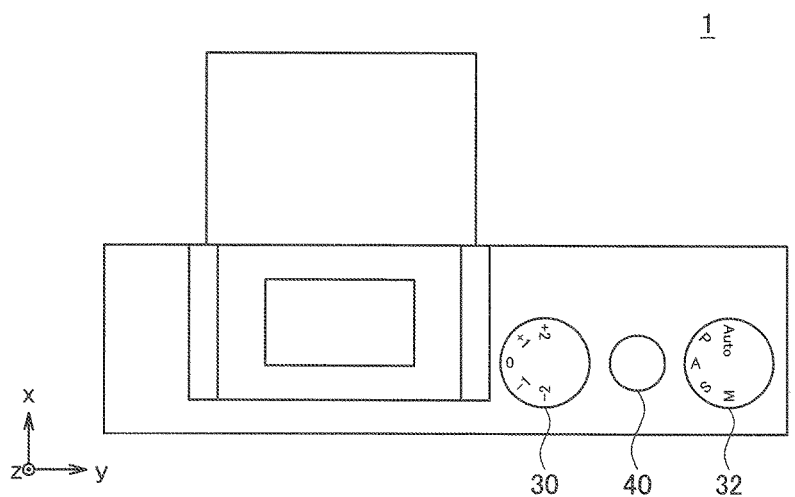
FIG. 3 is a plan view of the digital camera according to the embodiment.

The description below will proceed in the following order.
1. Schematic Configuration of Imaging Apparatus
2. Functional Configuration of Control Device
3. General Outline of AE-Detection-Region Setting
4. Control Process by Control Device
    4.1. AE-Detection-Region Setting Method
    4.2. Process During Activation
5. Hardware Configuration 1. Schematic Configuration of Imaging Apparatus First, a schematic configuration of an imaging apparatus equipped with a control device according to an embodiment of the present disclosure will be described. The imaging apparatus according to this embodiment is an imaging apparatus equipped with two imaging elements in a single imaging surface and is, for example, a digital camera 1 as shown in FIGS. 1 to 3. FIG. 1 is a cross-sectional view schematically illustrating a physical configuration of the digital camera 1 including the control device according to this embodiment. FIG. 2 is a rear view of the digital camera 1. FIG. 3 is a plan view of the digital camera 1.

The digital camera 1 is constituted of a lens unit, a main camera unit, and a flash unit. As shown in FIG. 1, the lens unit includes a photographic lens 10, a focusing lens 12, and a diaphragm 14. The main camera unit includes a photographic pixel group 16, a phase-difference detection pixel group 18, a liquid-crystal display (LCD) monitor 20, an electronic viewfinder (EVF) 22, an ocular lens 24, and a finder 26. The flash unit includes a light-emitting unit 28 and a light-emission control unit (not shown). Furthermore, as shown in FIGS. 2 and 3, the main camera unit includes an exposure correction dial 30, a photographic mode dial 32, an LCD-monitor operating dial 34, a preview button 36, an autofocus/manual-focus (AF/MF) switch button 38, and a shutter button 40.

The photographic lens 10 is an optical system that takes in light from a subject and projects a subject image onto the imaging elements.

The focusing lens 12 is an optical system that performs focus control of the subject image. For example, the focusing lens 12 is moved in an optical-axis direction (i.e., an X-axis direction) by a focusing-lens driving mechanism (not shown) that moves the focusing lens 12. The focusing-lens driving mechanism operates based on driving command information from the control device and moves the focusing lens 12. A focal point of the subject image can be controlled by the focusing lens 12 in this manner.

The diaphragm 14 adjusts the quantity of light taken in from the subject through the photographic lens 10 based on a control value set by a control device 100-1. For example, the diaphragm 14 is constituted of a plurality of diaphragm blades and is driven by a diaphragm mechanism (not shown) that moves the diaphragm blades. The diaphragm mechanism moves the diaphragm blades based on an f-number set by the control device 100-1 so that the quantity of light taken in from the subject can be adjusted.

The photographic pixel group 16 performs photo-electric conversion on the light taken in from the subject through the photographic lens 10. For example, the photographic pixel group 16 may be a solid-state imaging element, such as a complementary metal oxide semiconductor (CMOS) or a charge-coupled device (CCD).

The phase-difference detection pixel group 18 is a pixel group in which an optical-path direction of the light taken in from the subject through the photographic lens 10 is controlled. For example, micro-lenses corresponding to pixels in the phase-difference detection pixel group 18 may be arranged such that the center positions of the micro-lenses are not aligned with the center positions of the pixels. The photographic pixel group 16 and the phase-difference detection pixel group 18 are disposed in a single imaging surface. For example, the pixels in the photographic pixel group 16 may be arranged in odd-numbered rows, whereas the pixels in the phase-difference detection pixel group 18 may be arranged in even-numbered rows.

The LCD monitor 20 displays an image acquired by imaging as well as a stored image. Furthermore, the LCD monitor 20 displays an image used for setting, for example, a photographing method of the digital camera 1. For example, the LCD monitor 20 may be a liquid-crystal panel or an organic electroluminescence (EL) panel. Alternatively, the LCD monitor 20 may be a touch-screen.

The EVF 22 shows the image acquired by imaging. Specifically, the EVF 22 sequentially acquires an electric signal photo-electrically converted by the photographic pixel group 16 from the photographic pixel group 16 and projects an image based on the acquired electric signal onto the finder 26 via the ocular lens 24. For example, the EVF 22 may display the image acquired from the photographic pixel group 16 in real time.

The ocular lens 24 expands the image shown by the EVF 22.

The finder 26 is an eyepiece used by a user for checking the image shown by the EVF 22. The user can check a sequentially-imaged subject by looking into the finder 26.

The light-emitting unit 28 emits light in accordance with a light-emission quantity and a light-emission timing set by the light-emission control unit.

The light-emission control unit controls the light-emission quantity and the light-emission timing of the light-emitting unit 28 based on control values set by the control device 100-1. For example, the light-emission control unit controls pre-light emission and main light emission.

The exposure correction dial 30 is used for setting the degree of correction of an exposure control value during imaging. For example, if an image acquired by imaging is to be made brighter, the dial is set by being turned toward the positive side, or if the image is to be made darker, the dial is set by being turned toward the negative side. Exposure control related to correction may involve controlling of the gain, the exposure time, the aperture, or a combination thereof.

The photographic mode dial 32 is used for setting an exposure control mode. For example, the mode may be an auto mode (Auto), a program mode (P), an aperture priority mode (A), a shutter-speed priority mode (S), and a manual exposure mode (M). The auto mode and the program mode are modes in which the digital camera 1 automatically performs exposure control. The aperture priority mode is a mode in which an aperture value is set by the user and the aperture value is automatically controlled. The shutter-speed priority mode is a mode in which the exposure time is set by the user and the aperture value is automatically controlled. The manual exposure mode is a mode in which the aperture value and the exposure time are set by the user. By rotating the photographic mode dial 32 to set a desired mode to a preset position, the mode can be set.

The LCD-monitor operating dial 34 is used for operating an image displayed on the LCD monitor 20. Specifically, the user manipulates the LCD-monitor operating dial 34 to operate the image displayed on the LCD monitor 20 so as to perform, for example, setting operation of the digital camera 1.

The preview button 36 is used for setting whether or not to execute a preview. Specifically, the digital camera 1 transitions to a preview execution mode when the preview button 36 is pressed, and then transitions to a preview non-execution mode when the preview button 36 is pressed again. A preview in this case is, for example, displaying, on the LCD monitor 20 and the EVF 22, an image obtained when an image acquired from the photographic pixel group 16 in real time is exposure-controlled based on a set exposure control value.

The AF/MF switch button 38 is used for switching a focus setting of the digital camera 1 to autofocus or manual focus. Every time the AF/MF switch button 38 is pressed, the focus setting is switched between autofocus and manual focus.

The shutter button 40 is an operable section used for causing the digital camera 1 to execute an autofocusing (AF) process or an imaging process. Specifically, the AF process is executed when the shutter button 40 is half-pressed, and the imaging process is executed when the shutter button 40 is fully pressed.

Although not shown in FIGS. 1 to 3, the digital camera 1 includes the control device 100-1 constituted of, for example, a central processing unit (CPU) and a memory. Although an example in which the control device 100-1 is included in the digital camera 1 is described, the control device 100-1 may be included in, for example, an electronic apparatus, such as a smartphone, a tablet terminal, or a notebook-type personal computer.

2. Functional Configuration of Control Device

Figure 4:
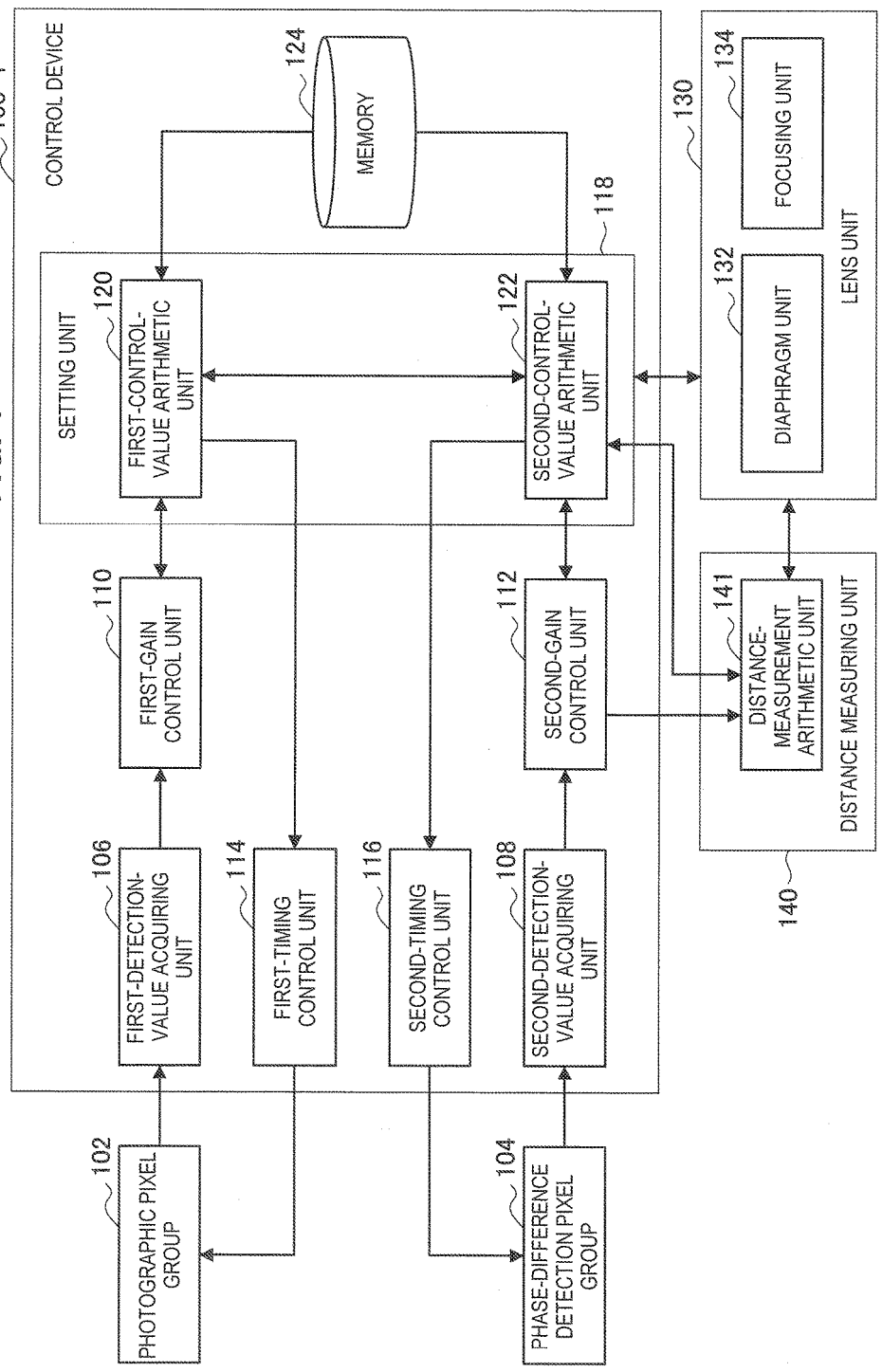
FIG. 4 is a block diagram schematically illustrating a functional configuration of the control device according to the embodiment.

Next, a functional configuration of the control device 100-1 according to this embodiment will be described with reference to FIG. 4. FIG. 4 is a block diagram schematically illustrating the functional configuration of the control device 100-1 according to this embodiment.

The control device 100-1 controls a photographic pixel group (first pixel group) 102 and a phase-difference detection pixel group (second pixel group) 104 that are disposed in a single imaging surface. The photographic pixel group 102 corresponds to the photographic pixel group 16 in FIG. 1, and the phase-difference detection pixel group 104 corresponds to the phase-difference detection pixel group 18 in FIG. 1.

An image acquired by the photographic pixel group 102 is also used as a monitor image to be displayed on the LCD monitor 20. For an actually photographed image, photographic gain and a photographic shutter speed are set automatically or in accordance with user settings. For the monitor image, first control values, such as first gain and a first shutter speed, are set so that a sharp and smooth image can be displayed on the LCD monitor 20. On the other hand, for the phase-difference detection pixel group 104, first control values, such as second gain and a second shutter speed, are set independently of the photographic pixel group 102 so as to enhance AF performance.

As shown in FIG. 4, the control device 100-1 includes a first-detection-value acquiring unit 106, a second-detection-value acquiring unit 108, a first-gain control unit 110, a second-gain control unit 112, a first-timing control unit 114, a second-timing control unit 116, a setting unit 118, and a memory 124.

The first-detection-value acquiring unit 106 detects an imaging signal from the photographic pixel group 102 and outputs a first detection value. The first detection value is output from the first-detection-value acquiring unit 106 to the first-gain control unit 110.

The second-detection-value acquiring unit 108 detects an imaging signal from the phase-difference detection pixel group 104 and outputs a second detection value. The second detection value is output from the second-detection-value acquiring unit 108 to the second-gain control unit 112. The phase-difference detection pixel group 104 and the first-detection-value acquiring unit 106 simultaneously read the respective imaging signals.

The first-gain control unit 110 performs gain adjustment on the first detection value based on the first gain. After amplifying the first detection value by applying the first gain thereto, the first-gain control unit 110 outputs the first detection value to a first-control-value arithmetic unit 120 in the setting unit 118.

The second-gain control unit 112 performs gain adjustment on the second detection value based on the second gain. The second-gain control unit 112 according to this embodiment functions independently of the first-gain control unit 110. After amplifying the second detection value by applying the second gain thereto, the second-gain control unit 112 outputs the second detection value to a second-control-value arithmetic unit 122 in the setting unit 118.

The first-timing control unit 114 performs exposure control of the photographic pixel group 102 based on the first shutter speed (i.e., a first exposure time). The first-timing control unit 114 controls the exposure of the photographic pixel group 102 based on the first shutter speed calculated by the first-control-value arithmetic unit 120 in the setting unit 118, which will be described later.

The second-timing control unit 116 performs exposure control of the phase-difference detection pixel group 104 based on a second exposure time (i.e., the second shutter speed). The second-timing control unit 116 functions independently of the first-timing control unit 114 and controls the exposure of the phase-difference detection pixel group 104 based on the second exposure time calculated by the second-control-value arithmetic unit 122 in the setting unit 118, which will be described later. The first-timing control unit 114 and the second-timing control unit 116 simultaneously expose the respective pixel groups to light.

The setting unit 118 is a functional unit that calculates control values used for performing exposure control of the pixel groups 102 and 104 and includes the first-control-value arithmetic unit 120 and the second-control-value arithmetic unit 122.

The first-control-value arithmetic unit 120 calculates the first shutter speed, the first gain for adjusting the first detection value, and a set value (referred to as "aperture value" hereinafter) of the diaphragm 14 based on the first detection value gain-adjusted at the first-gain control unit 110 and information from the lens unit. The information from the lens unit includes, for example, AF information and aperture information. Then, the first-control-value arithmetic unit 120 outputs the first shutter speed to the first-timing control unit 114, the first gain to the first-gain control unit 110, and the aperture value to the second-control-value arithmetic unit 122.

Furthermore, the first-control-value arithmetic unit 120 sets an AE detection region (first AE detection region) within which an electric signal is acquired from the photographic pixel group 102 when calculating the first control values. Based on the AE detection region set by the first-control-value arithmetic unit 120, the first-detection-value acquiring unit 106 acquires the first detection value.

Based on the second detection value gain-adjusted at the second-gain control unit 112 and the aperture value calculated by the first-control-value arithmetic unit 120, the second-control-value arithmetic unit 122 calculates the second shutter speed and the second gain for adjusting the second detection value. Then, the second-control-value arithmetic unit 122 outputs the second shutter speed to the second-timing control unit 116 and the second gain to the second-gain control unit 112.

Similar to the first-control-value arithmetic unit 120, the second-control-value arithmetic unit 122 sets an AE detection region (second AE detection region) within which an electric signal is acquired from the phase-difference detection pixel group 104 when calculating the second control values. Based on the second AE detection region set by the second-control-value arithmetic unit 122, the second-detection-value acquiring unit 108 acquires the second detection value.

The memory 124 is a storage unit that stores therein, for example, various kinds of setting information and captured images of the digital camera 1. The memory 124 is constituted of a storage medium, such as a read-only memory (ROM) or a random access memory (RAM). For example, the various kinds of setting information stored in the memory 124 are read by the first-control-value arithmetic unit 120 and the second-control-value arithmetic unit 122 in the setting unit 118 so as to be used for arithmetic processes.

A lens unit 130 corresponds to the lens unit shown in FIG. 1 and includes, for example, a diaphragm unit 132 configured to control the diaphragm mechanism that drives the diaphragm 14, as well as a focusing unit 134 configured to control the focusing-lens driving mechanism that drives the focusing lens 12. The lens unit 130 operates based on calculation results of the setting unit 118 of the control device 100-1. In this case, a distance to a subject, which is calculated by a distance measuring unit 140, is used.

The distance measuring unit 140 includes a distance-measurement arithmetic unit 141 that calculates the distance to the subject by using a distance measurement point. The distance-measurement arithmetic unit 141 performs a distance measuring process by using the second detection value gain-adjusted at the second-gain control unit 112, the second control values calculated by the second-control-value arithmetic unit 122, and lens information acquired from the lens unit 130. A calculation result obtained by the distance-measurement arithmetic unit 141 is output to the second-control-value arithmetic unit 122 and the lens unit 130.

3. General Outline of AE-Detection-Region Setting

Figure 5:
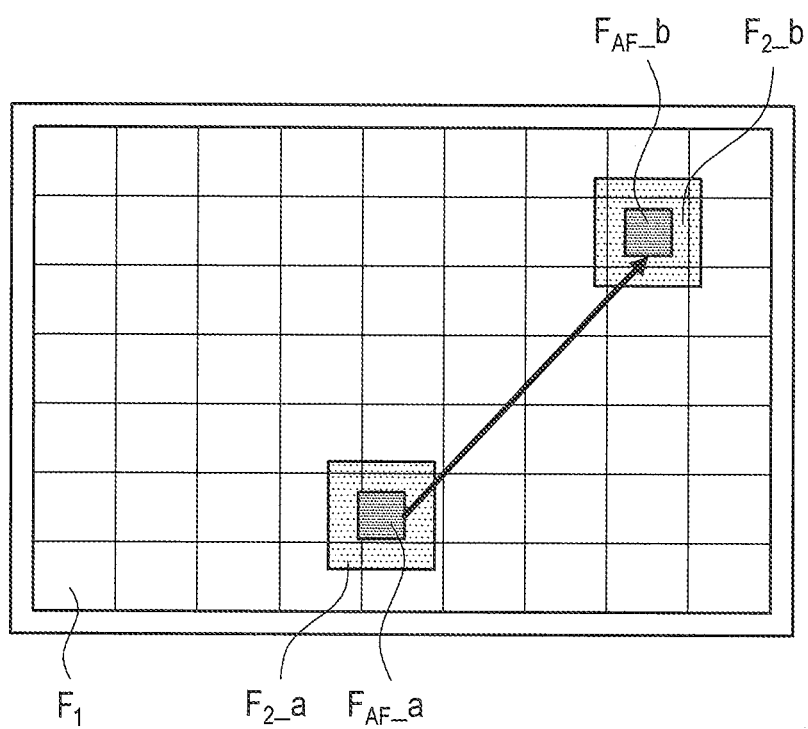
FIG. 5 schematically illustrates an AE-detection-region setting method according to the embodiment.

Next, a general outline of an AE-detection-region setting method performed by the control device 100-1 according to this embodiment will be described with reference to FIG. 5. FIG. 5 schematically illustrates the AE-detection-region setting method according to this embodiment.

As described above, the digital camera 1 according to this embodiment includes the photographic pixel group 102 and the phase-difference detection pixel group 104 that are disposed in a single imaging surface, and the control device 100-1 can independently set the AE settings of the respective pixel groups. Therefore, the control device 100-1 causes the first-control-value arithmetic unit 120 to calculate the first gain and the first shutter speed of the photographic pixel group 102 as well as the set value of the diaphragm 14. On the other hand, the second-control-value arithmetic unit 122 calculates the second gain and the second shutter speed of the phase-difference detection pixel group 104 independently of the first-control-value arithmetic unit 120.

With regard to such a digital camera 1, the present inventors have focused attention on independently setting the AE settings of the photographic pixel group 102 and the phase-difference detection pixel group 104 and have considered setting the AE detection region of the phase-difference detection pixel group 104 based on an autofocus (AF) setting. Specifically, the AE detection region of the phase-difference detection pixel group 104 is set independently of the photographic pixel group 102 that presents a monitor image to the user. In other words, exposure control of the phase-difference detection pixel group 104 is performed in accordance with a designated focus position, and the exposure control of the phase-difference detection pixel group 104 is performed independently of exposure control of the photographic pixel group 102.

A detailed description will be provided below with reference to FIG. 5. In the following description, a first AE detection region, a second AE detection region, and an AF detection region to be described later are regions expressed by parameters internally processed within the control device 100-1 and are not to be displayed as user interfaces on, for example, the LCD monitor 20. In correspondence with the first AE detection region, the second AE detection region, and the AF detection region, at least one of a first AE detection frame, a second AE detection frame, and an AF frame may be displayed as a user interface on, for example, the LCD monitor 20. The internal parameters and the frames displayed as user interfaces often substantially match, and a detection region, which is an internal parameter, can also be estimated from each frame. Thus, a process to be described below may be executed based on each frame displayed as a user interface, or the process to be described below may be executed by using an internally-processed parameter set in association with each frame.

As shown in FIG. 5, an AE detection region (also referred to as "first AE detection region" hereinafter) $F_1$ of the photographic pixel group 102 within an imaging range is set based on multi-division photometry in the entire angle of view. A plurality of first AE detection regions $F_1$ are set over the entire angle of view. Therefore, with regard to the photographic pixel group 102, exposure is set in view of the entire angle of view based on the quantity of light measured in each first AE detection region $F_1$.

On the other hand, in the related art, an AE detection region (also referred to as "second AE detection region" hereinafter) $F_2$ of the phase-difference detection pixel group 104 is similarly set in accordance with each first AE detection region $F_1$ of the photographic pixel group 102. However, with this setting method, since it is difficult to perform automatic exposure specific for autofocusing, the second AE detection region $F_2$ in this embodiment is set in correspondence with the AF detection region that expresses a designated focus position. It is assumed that the AF detection region and the AE detection regions can be set independently.

For example, it is assumed that the user can set the AF detection region and the AE detection regions via menu settings. In this case, it is assumed that the AE-detection-region setting process is performed by the user for the first AE detection regions $F_1$ of the photographic pixel group 102. For example, the user sets a flexible spot mode for the AF detection region and a multi-division photometric mode for the AE detection regions. In this case, as shown in FIG. 5, the plurality of first AE detection regions $F_1$ of the photographic pixel group 102 are set over the entire angle of view. After the brightness of a subject within the first AE detection regions $F_1$ is appropriately adjusted by an AE process, a monitor image is displayed on the LCD monitor 20.

On the other hand, an AF detection region $F_{AF}$ is set for performing control in autofocusing such that a subject within the AF detection region $F_{AF}$ is brought into focus. When the flexible spot mode is set, the user can arbitrary set a focus position. For example, the user may operate the LCD-monitor operating dial 34 or touch the LCD monitor 20 so as to set a desired focus position, whereby, for example, an AF detection region $F_{AF\_a}$ can be set, as shown in FIG. 5.

The control device 100-1 according to this embodiment sets a second AE detection region $F_{2\_a}$ of the phase-difference detection pixel group 104 in correspondence with the set AF detection region $F_{AF\_a}$. The second AE detection region $F_{2\_a}$ is set specifically for AF and is set, for example, at a position near the AF detection region $F_{AF\_a}$ and to a size with which the AF detection region $F_{AF\_a}$ can be maximally exposed to light. Accordingly, the second AE detection region $F_2$ is set based on the AF detection region $F_{AF}$ instead of an AE detection region so that AF performance can be enhanced.

With regard to the AF detection region, the set position thereof may be changed by the user or may shift by automatically tracking a moving subject. In this case, the second AE detection region $F_2$ may be configured to move and track the AF detection region $F_{AF}$. For example, as shown in FIG. 5, when the AF detection region $F_{AF\_}a$ moves to an AF detection region $F_{AF\_}b$, a second AE detection region $F_{2\_}b$ is also set for the second AE detection region $F_{2\_}a$ in correspondence with the AF detection region $F_{AF\_}b$. Thus, exposure optimal for autofocusing can be constantly performed even when the AF detection region $F_{AF}$ moves. In this case, for example, the size of the second AE detection region $F_2$ may be dynamically changed.

4. Control Process by Control Device 4.1. AE-Detection-Region Setting Method

Figure 6:
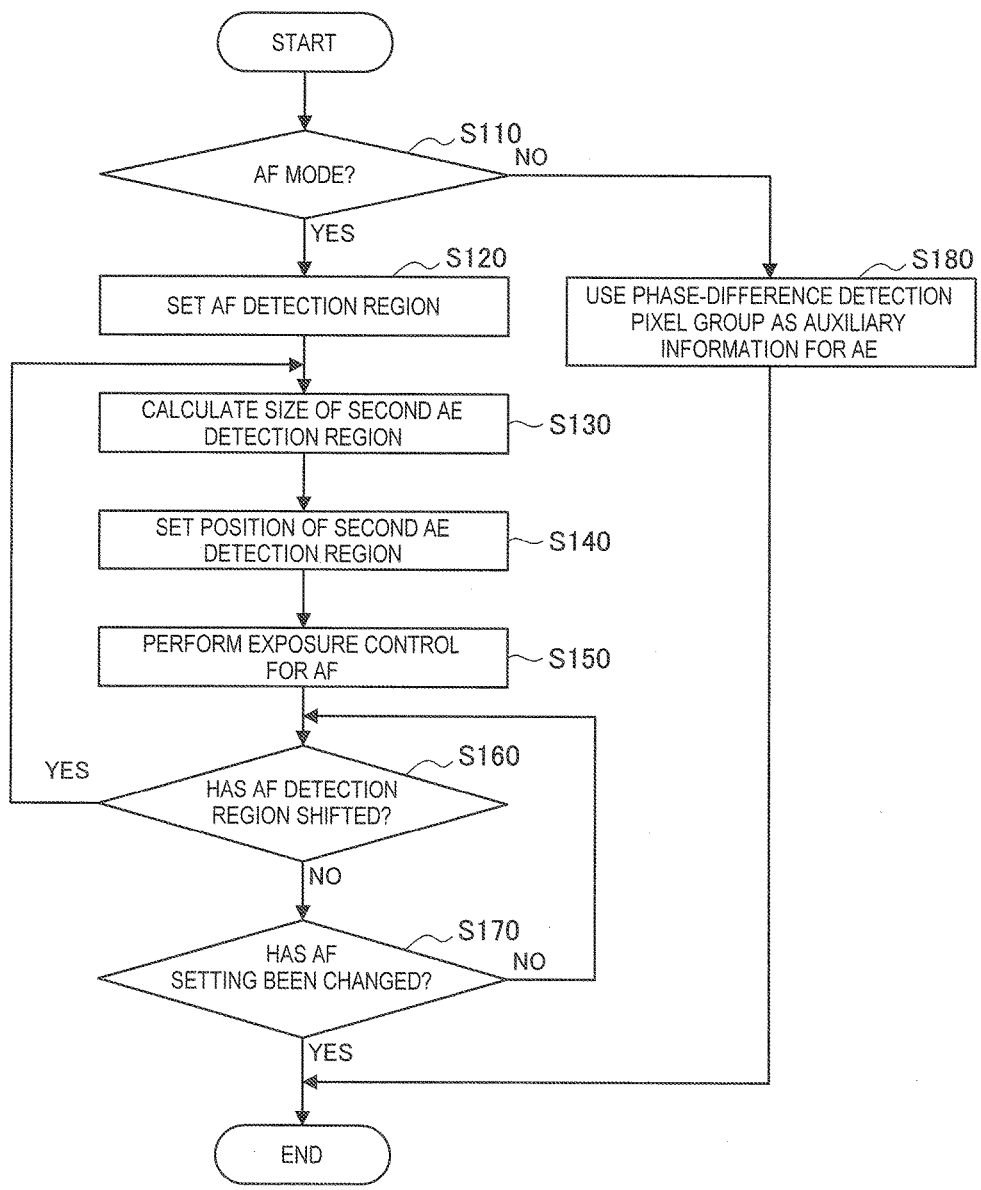
FIG. 6 is a flowchart illustrating the AE-detection-region setting method performed by the control device according to the embodiment.

Next, an AE-detection-region setting method, which is a control process performed by the control device 100-1 according to this embodiment, will be described with reference to FIG. 6. FIG. 6 is a flowchart illustrating the AE-detection-region setting method performed by the control device 100-1 according to this embodiment.

The AE-detection-region setting method performed by the control device 100-1 according to this embodiment commences, for example, when the digital camera 1 is activated. When activation of the digital camera 1 is detected, the control device 100-1 first checks the setting of a focus mode (step S110), as shown in FIG. 6. The setting of the focus mode can be recognized based on an on/off state of the AF/MF switch button 38.

When in an autofocus (AF) mode, the control device 100-1 sets an AF distance measurement point in accordance with an AF detection region (step S120). For example, the AF detection region may be set automatically or may be set by a user. When the AF detection region is set, the second-control-value arithmetic unit 122 of the control device 100-1 calculates the size of an AE detection region (i.e., second AE detection region $F_2$) of the phase-difference detection pixel group 104 (step S130).

In step S130, the size of the second AE detection region is set such that the exposure of the AF detection region becomes optimal. For example, as shown in FIG. 5, the second AE detection region $F_2$ may be set to a size larger than that of the AF detection region $F_{AF}$ so as to encompass the AF detection region $F_{AF}$. The present technology is not limited to this example. Because the second AE detection region $F_2$ is set such that the exposure of the AF detection region $F_{AF}$ becomes optimal, the size of the second AE detection region $F_2$ may change in accordance with a change in the size of the AF detection region $F_{AF}$ or may change in accordance with photographing conditions, such as the size of a subject, contrast information of the surroundings, and the moving speed of a subject to be tracked.

When the size of the second AE detection region $F_2$ is set, the second-control-value arithmetic unit 122 subsequently sets the position of the AE detection region (i.e., the second AE detection region $F_2$) of the phase-difference detection pixel group 104 (step S140). The position of the second AE detection region $F_2$ is set so as to encompass the AF detection region $F_{AF}$. In this case, the second AE detection region $F_2$ may be set with the AF detection region $F_{AF}$ as the center. Alternatively, the second AE detection region $F_2$ may be set to a range that is larger (or smaller) than the AF detection region $F_{AF}$ in a predetermined direction in accordance with photographing conditions, such as the size of a subject, contrast information of the surroundings, and the moving speed of a subject to be tracked.

When the second AE detection region $F_2$ is set in step S130 and step S140, the second-detection-value acquiring unit 108 acquires a second detection value from the phase-difference detection pixel group 104 based on the set second AE detection region $F_2$, and the second-gain control unit 112 performs gain adjustment on the second detection value. Then, the second-control-value arithmetic unit 122 calculates second gain and a second shutter speed as AE settings (i.e., second control values) of the phase-difference detection pixel group 104 based on the gain-adjusted second detection value. The second-timing control unit 116 controls the exposure time based on the second control values calculated by the second-control-value arithmetic unit 122 and performs exposure control specific for AF on the phase-difference detection pixel group 104 (step S150).

In this case, a set value of the diaphragm 14 during the exposure control is calculated by the first-control-value arithmetic unit 120 based on a first detection value acquired from the photographic pixel group 102. The second-control-value arithmetic unit 122 calculates the second control values based on the set value of the diaphragm 14 set by the first-control-value arithmetic unit 120.

When the exposure control is performed on the phase-difference detection pixel group 104 in step S150, the control device 100-1 determines whether or not the AF detection region has shifted (step S160). For example, the AF detection region may shift automatically in accordance with movement of the subject or may be shifted in accordance with changed user settings. If the AF detection region has shifted, the operation returns to step S130 so that the second AE detection region is set again based on a newly-set AF detection region. If it is determined in step S160 that the AF detection region has not shifted, it is determined whether or not an AF setting has been changed (step S170).

If it is determined in step S170 that the AF setting has not been changed, the operation returns to step S160 so as to repeat the process. On the other hand, if it is determined in step S170 that the AF setting has been changed, the process shown in FIG. 6 ends, and the process in FIG. 6 starts from the beginning.

Referring back to step S110, when the setting of the focus mode is a manual focus (MF) mode, the control device 100-1 uses the phase-difference detection pixel group 104 as auxiliary information for AE (step S180). When in the MF mode, the phase-difference detection pixel group 104 does not have to be used for AF. In this embodiment, the settings of the phase-difference detection pixel group 104 are utilized as auxiliary information for an AE process so that an appropriate AE process is performed.

For example, the second-control-value arithmetic unit 122 sets the second control values, which are the AE settings of the phase-difference detection pixel group 104, to values different from the first control values, which are the AE settings of the photographic pixel group 102. Specifically, for example, the shutter speed may be increased by setting the first gain for the photographic pixel group 102 lower than the second gain for the phase-difference detection pixel group 104, or the shutter speed may be reduced by setting the second gain higher than the first gain. Accordingly, by setting an interlocking range of the second gain to be wider than an interlocking range of the first gain, for example, a luminance region where it is difficult to obtain linear detection in the photographic pixel group 102 can be detected and be utilized for expanding the dynamic range.

The AE-detection-region setting method performed by the control device 100-1 according to this embodiment has been described above. With this AE-detection-region setting method, the second AE detection region of the phase-difference detection pixel group 104 is set in accordance with the AF detection region. Consequently, an image updating cycle of the phase-difference detection pixel group 104 can be set to a value optimized for AF, so that an increased AF speed can be realized. Furthermore, by setting the second AE detection region in this manner, automatic gain control (AGC) that affects brightness and noise can be optimized, so that AF precision can be improved.

In this case, even when the exposure mode is, for example, a manual exposure mode (M) or an AE lock mode, the AE settings of the photographic pixel group 102 are simply set to the corresponding exposure mode so that AE settings specific for AF can be set for the phase-difference detection pixel group 104. This AE-detection-region setting process is applicable to, for example, AF-C in which focus is not locked even when the shutter button is half-pressed.

When the digital camera 1 is set to the manual focus mode, since the phase-difference detection pixel group 104 does not have to be used for AF, the phase-difference detection pixel group 104 can be utilized as auxiliary information for an AE process. For example, the dynamic range can be expanded by expanding the interlocking range of the second gain for the phase-difference detection pixel group 104. Thus, AE tracking can be performed quickly and more accurately.

In the above-described process, the tracking speed of the second AE detection region of the phase-difference detection pixel group 104 relative to the AF detection region may be set to be higher than the tracking speed of each first AE detection region of the photographic pixel group 102. Thus, target luminance optimal for AF can be reached quickly, thereby allowing for a high-speed AF process.

4.2. Process During Activation

In the above-described AE-detection-region setting method shown in FIG. 6, step S180 may also be executed when the digital camera 1 is activated such that the phase-difference detection pixel group 104 may be used as auxiliary information for AE. Thus, for example, a second interlocking range of the phase-difference detection pixel group 104 can be made wider than a first interlocking range of the photographic pixel group 102, so that the dynamic range can be expanded. Therefore, AE can be tracked quickly, so that the activation time of the digital camera 1 can be shortened. After the digital camera 1 is activated, the process from step S110 and onward shown in FIG. 6 is executed. In the case of the AF mode, the second AE detection region of the phase-difference detection pixel group 104 is set in accordance with the AF detection region, so that AF performance can be enhanced.

5. Hardware Configuration

The process performed by the control device 100-1 according to the above-described embodiment is achieved in accordance with cooperation between software and hardware of the control device 100-1 to be described below.

Figure 7:
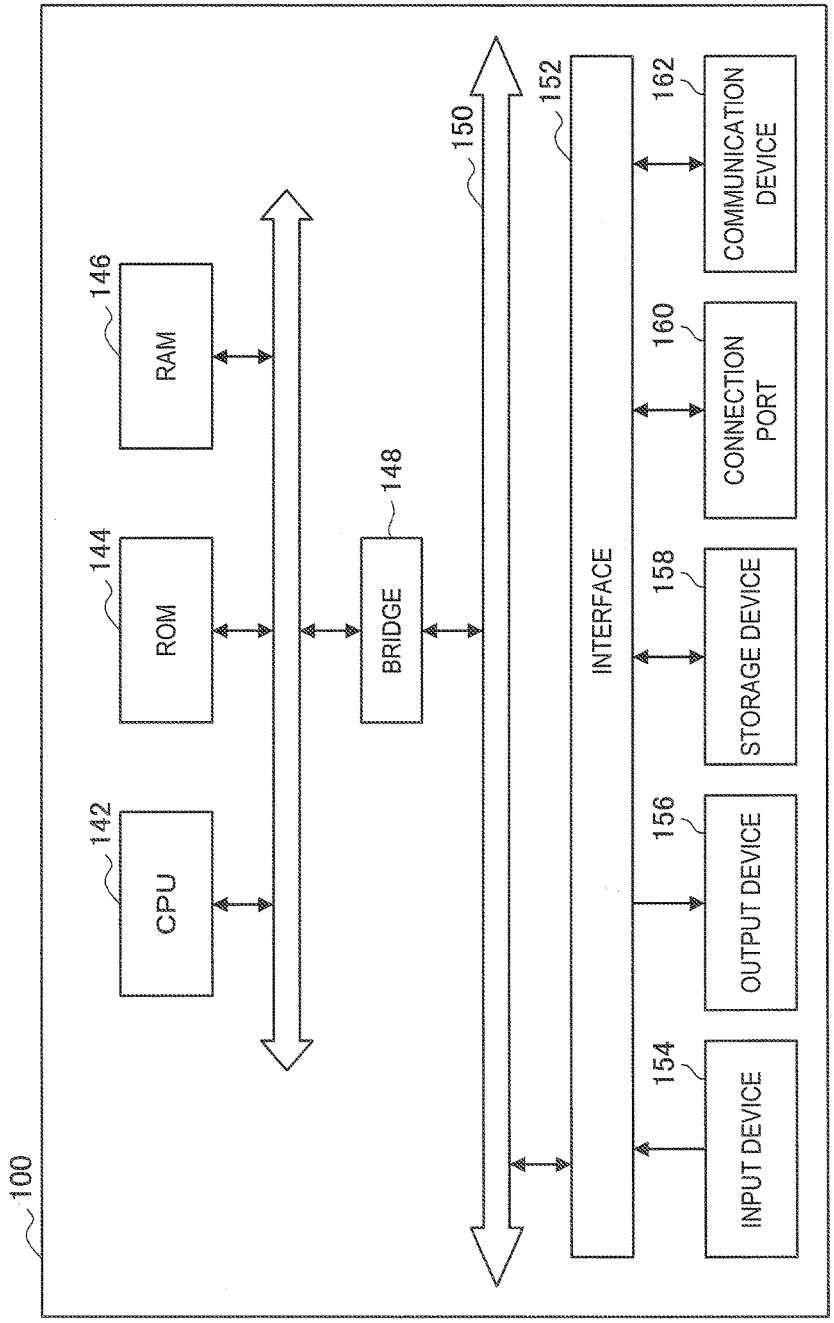
FIG. 7 illustrates a configuration example of a hardware configuration of the control device according to an embodiment of the present disclosure.

FIG. 7 illustrates a hardware configuration of the control device 100-1 according to the embodiment of the present disclosure. As shown in FIG. 7, the control device 100-1 includes a central processing unit (CPU) 142, a read-only memory (ROM) 144, a random access memory (RAM) 146, a bridge 148, a bus 150, an interface 152, an input device 154, an output device 156, a storage device 158, a connection port 160, and a communication device 162.

The CPU 142 functions as an arithmetic processor and a controller and realizes the operation of the setting unit 118, the first-control-value arithmetic unit 120, and the second-control-value arithmetic unit 122 within the control device 100-1 by operating in cooperation with various kinds of programs. Alternatively, the CPU 142 may be a microprocessor. The ROM 144 stores therein, for example, a program or an arithmetic parameter to be used by the CPU 142. The RAM 146 temporarily stores therein, for example, a program to be used in execution of the CPU 142 or a parameter that appropriately changes in the execution. The ROM 144 and the RAM 146 realize a part of the memory 124 within the control device 100-1. The CPU 142, the ROM 144, and the RAM 146 are connected to one another by an internal bus constituted of, for example, a CPU bus.

The input device 154 includes, for example, an input section, such as a touch-screen, a button, a microphone, a switch, and a lever, configured to be used by a user for inputting information, and an input control circuit that generates an input signal based on input from the user and that outputs the signal to the CPU 142. The user of the control device 100-1 operates the input device 154 so as to input various kinds of data to the control device 100-1 or to command execution of processing.

The output device 156 performs, for example, output to a device, such as a liquid-crystal display (LCD) device, an organic light emitting diode (OLED) device, or a lamp. Furthermore, the output device 156 may perform audio output to, for example, a speaker and a headphone.

The storage device 158 is a device for storing data therein. The storage device 158 may include, for example, a storage medium, a storage unit that stores data into a storage medium, a reading unit that reads data from a storage medium, and a deleting unit that deletes data stored in a storage medium. The storage device 158 stores therein a program to be executed by the CPU 142 as well as various kinds of data.

The communication device 160 is, for example, a bus for connecting to an external device or a peripheral device of the control device 100-1. The communication device 160 may be a universal serial bus (USB).

The communication device 162 is, for example, a communication interface constituted of a communication unit for connecting to a network. The communication device 162 may be an infrared-communication-compliant device, a wireless local-area-network (LAN) compliant communication device, a long-term-evolution (LTE) compliant communication device, or a wired communication device that performs wired communication.

Although a preferred embodiment of the present disclosure has been described above in detail with reference to the appended drawings, the technical scope of the present disclosure is not limited to the above example. It should be understood by those with a general knowledge of the technical field of the present disclosure that various modifications or alterations may occur insofar as they are within the technical scope of the appended claims, and that these modifications or alterations are included in the technical scope of the present disclosure.

For example, although the control device 100-1 is included in the digital camera 1 in the above embodiment, the present technology is not limited to this example. For example, at least a part of the function included in the control device 100-1 may be provided in, for example, a server connected in a communicable manner to the imaging apparatus via a network. For example, in the control device 100-1 shown in FIG. 4, the functional units excluding the first-detection-value acquiring unit 106 and the second-detection-value acquiring unit 108 may be included in the server.

In this case, the first detection value acquired from the photographic pixel group 102 and the second detection value acquired from the phase-difference detection pixel group 104 are output to the server via the network and are gain-adjusted. Subsequently, first control values and second control values are calculated at the setting unit 118. The calculated control values are output to the imaging apparatus, and the focusing lens 12 and the diaphragm 14 are driven based on these control values.

Furthermore, although the above embodiment relates to an example in which the phase-difference detection pixel group 18 is used as a second pixel group, the present technology is not limited to this example. For example, the second pixel group may be a pixel group that captures an image with a depth of field that is different from that of an image captured by the first pixel group. Specifically, microlenses with different focal lengths may be provided respectively for the first pixel group and the second pixel group, so that images with different depths of field can be acquired by the first pixel group and the second pixel group. Accordingly, pixel groups for various purposes can be employed as the second pixel group, so that the versatility of the second pixel group can be enhanced.

Furthermore, although the first detection regions are set based on multi-division photometry in the above embodiment, the present technology is not limited to this example. For example, each first detection region may be set based on a center-weighted region or a spot region set by, for example, the user, or may be set based on a facial region designated by a facial recognition process.

The advantages discussed in this specification are strictly for descriptive or exemplary purposes and are not to be limitative. In other words, in addition to or in place of the above-described advantages, the technology according to the present disclosure may exhibit other advantages that are obvious to those skilled in the art from this specification.

Additionally, the present technology may also be configured as below.

(1) A control device that controls exposure of a first pixel group and a second pixel group disposed in a single imaging surface,
wherein the control device performs exposure control of the second pixel group independently of exposure control of the first pixel group in accordance with a designated focus position.

(2) The control device according to (1), wherein a range of an automatic-exposure detection region of the second pixel group is dynamically changed in accordance with a setting of the designated focus position.

(3) The control device according to (1) or (2), wherein a size of an automatic-exposure detection region of the second pixel group is set based on a size of a region expressing the designated focus position.

(4) The control device according to any one of (1) to (3), wherein an automatic-exposure detection region of the second pixel group is set based on contrast information of an area surrounding the designated focus position.

(5) The control device according to any one of (1) to (4), wherein an automatic-exposure detection region of the second pixel group is set based on a moving speed of a subject to be tracked.

(6) The control device according to any one of (1) to (5), wherein an automatic-exposure detection region of the second pixel group is set in accordance with a focus mode.

(7) The control device according to (6), wherein a dynamic range of the second pixel group is expanded when the focus mode is a manual focus mode.

(8) The control device according to any one of (1) to (7), wherein the first pixel group is a photographic pixel group, and the second pixel group is a phase-difference detection pixel group.

(9) The control device according to any one of (1) to (8), wherein the designated focus position is expressed by a parameter to be used in internal processing.

(10) The control device according to any one of (1) to (9), wherein the designated focus position is displayed as a user interface on a display unit.

(11) A control method including:
performing exposure control of a second pixel group independently of exposure control of a first pixel group in accordance with a designated focus position, the first pixel group and the second pixel group being disposed in a single imaging surface.

(12) A control system including:
a first pixel group and a second pixel group configured to be disposed in a single imaging surface; and
a control unit configured to control exposure of the first pixel group and the second pixel group,
wherein the control unit performs exposure control of the second pixel group independently of exposure control of the first pixel group in accordance with a designated focus position.

What is claimed is:

1. A control device comprising:
a control circuitry configured to
independently perform a first exposure control of a first pixel group disposed in a single imaging surface, and
independently perform a second exposure control of a second pixel group disposed in the single imaging surface,
wherein the second exposure control is performed simultaneously with the first exposure control and in accordance with a designated focus position,
wherein a region expressing the designated focus position is a first area with a first size,
wherein an automatic-exposure detection region of the second pixel group is a second area with a second size, and
wherein the second area is larger than and includes the first area.

2. The control device according to claim 1, wherein a range of an automatic-exposure detection region of the second pixel group is dynamically changed in accordance with a setting of the designated focus position.

3. The control device according to claim 1, wherein a size of an automatic-exposure detection region of the second pixel group is set based on a size of a region expressing the designated focus position.

4. The control device according to claim 1, wherein an automatic-exposure detection region of the second pixel group is set based on contrast information of an area surrounding the designated focus position.

5. The control device according to claim 1, wherein an automatic-exposure detection region of the second pixel group is set based on a moving speed of a subject to be tracked.

6. The control device according to claim 1, wherein an automatic-exposure detection region of the second pixel group is set in accordance with a focus mode.

7. The control device according to claim 6, wherein a dynamic range of the second pixel group is expanded when the focus mode is a manual focus mode.

8. The control device according to claim 1, wherein the designated focus position is expressed by a parameter to be used in internal processing.

9. The control device according to claim 1, wherein the designated focus position is displayed as a user interface on a display unit.

10. The control device according to claim 1, wherein the first exposure control includes setting at least one of a first gain and a first shutter speed, and the second exposure control includes setting at least one of a second gain and a second shutter speed.

11. The control device according to claim 10, comprising:
a first arithmetic circuitry configured to calculate the first gain and the first shutter speed based on information from the first pixel group, and
a second arithmetic circuitry configured to calculate the second gain and the second shutter speed based on information from the second pixel group.

12. The control device according to claim 10, comprising:
a first arithmetic circuitry configured to calculate the first gain and the first shutter speed based on information from the first pixel group and a lens, and
a second arithmetic circuitry configured to calculate the second gain and the second shutter speed based on information from the second pixel group and the first arithmetic circuitry.

13. The control device according to claim 1, wherein the first pixel group is a photographic pixel group, and wherein the second pixel group is a phase-difference detection pixel group.

14. The control device according to claim 1, wherein the first pixel group is arranged in odd rows of a pixel array of the single imaging surface, and wherein the second pixel group is arranged in even rows of the pixel array of the single imaging surface.

15. A control device comprising:
a control circuitry configured to
independently perform a first exposure control of a first pixel group disposed in a single imaging surface, and
independently perform a second exposure control of a second pixel group disposed in the single imaging surface simultaneously with the first exposure control of the first pixel group and in accordance with a designated focus position,
wherein the first pixel group is a photographic pixel group, and the second pixel group is a phase-difference detection pixel group,
wherein a range of an automatic-exposure detection region of the second pixel group is dynamically changed in accordance with a setting of the designated focus position,
wherein a region expressing the designated focus position is a first area with a first size,
wherein an automatic-exposure detection region of the second pixel group is a second area with a second size, and
wherein the second area is larger than and includes the first area.

16. A control method comprising:
independently performing, with a first pixel group of a single imaging surface, a first exposure control; and
independently performing, with a second pixel group of the single imaging surface, a second exposure control simultaneously with the first exposure control of the first pixel group and in accordance with a designated focus position,
wherein a region expressing the designated focus position is a first area with a first size,
wherein an automatic-exposure detection region of the second pixel group is a second area with a second size, and
wherein the second area is larger than and includes the first area.

17. A control system comprising:
a first pixel group and a second pixel group disposed in a single imaging surface; and
a control circuitry configured to
independently perform a first exposure control of the first pixel group, and
independently perform a second exposure control of the second pixel group simultaneously with the first exposure control and in accordance with a designated focus position,
wherein a region expressing the designated focus position is a first area with a first size
wherein an automatic-exposure detection region of the second pixel group is a second area with a second size, and
wherein the second area is larger than and includes the first area.

18. The control system according to claim 17, wherein a range of an automatic-exposure detection region of the second pixel group is dynamically changed in accordance with a setting of the designated focus position.

19. The control system according to claim 17, wherein a size of an automatic-exposure detection region of the second pixel group is set based on a size of a region expressing the designated focus position.

20. The control system according to claim 17, wherein an automatic-exposure detection region of the second pixel group is set based on contrast information of an area surrounding the designated focus position.

21. The control system according to claim 17, wherein an automatic-exposure detection region of the second pixel group is set based on a moving speed of a subject to be tracked.

22. The control system according to claim 17, wherein an automatic-exposure detection region of the second pixel group is set in accordance with a focus mode.

* * * * *